Oct. 17, 1961    V. POMPER ET AL    3,004,610
HYDRAULIC CONTROL SYSTEMS FOR AGRICULTURAL TRACTORS
Filed April 10, 1959    3 Sheets-Sheet 1

INVENTORS
Victor Pomper
Louis Pignolet
BY
Bailey, Stephens & Huettig
ATTORNEYS

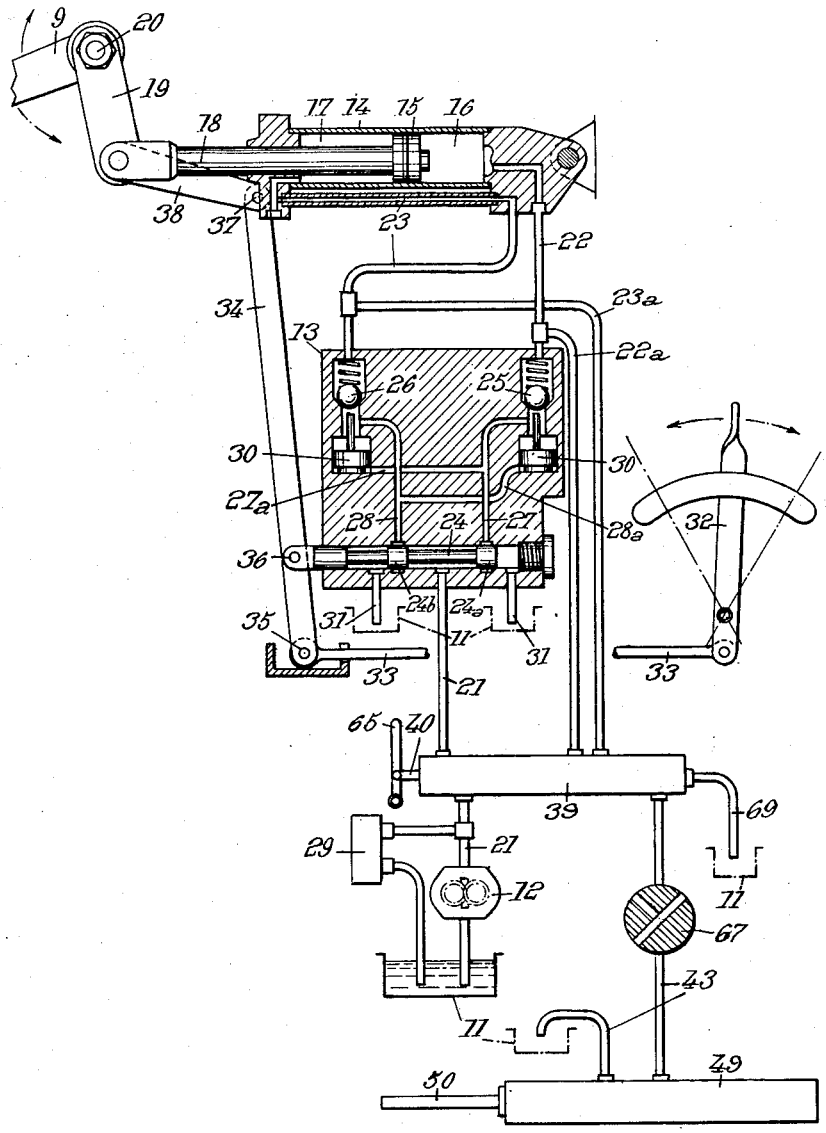

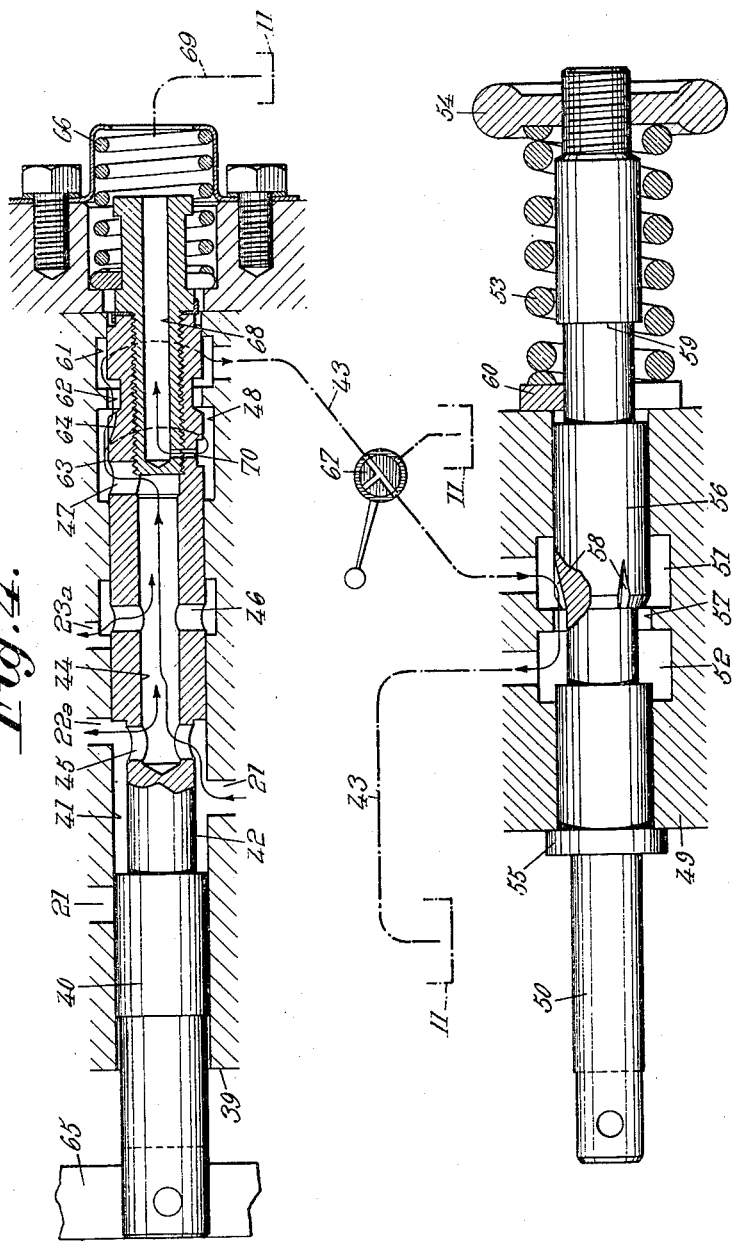

United States Patent Office 3,004,610
Patented Oct. 17, 1961

3,004,610
HYDRAULIC CONTROL SYSTEMS FOR
AGRICULTURAL TRACTORS
Victor Pomper, Paris, and Louis Pignolet, Lyon, France, assignors to Societe Industrielle Generale de Mecanique Appliquee S.I.G.M.A., Paris, France, a corporation of France
Filed Apr. 10, 1959, Ser. No. 805,555
Claims priority, application France Apr. 14, 1958
5 Claims. (Cl. 172—7)

The present invention relates to hydraulic control systems for agricultural tractors of the type including a hydraulic motor for controlling the position of a plough or analogous implement. The hydraulic motor may be either a double action one capable of lifting and lowering the plough, or a single action one adapted to let the plough move down. The plough or analogous implement is "semi-carried" by the tractor, which means that it is connected on the one hand with the tractor, through pivot means giving said plough a degree of freedom in the vertical direction, and on the other hand with the ground through at least one element such as a supporting wheel.

For some ploughing works, the plough is left floating, that is to say the piston of the hydraulic motor is left capable of moving freely in its cylinder, the tank which serves to feed liquid to the system being connected either with both of the active chambers of the hydraulic motor (in the case of a double action hydraulic motor), or with the single active chamber (in the case of a single action hydraulic motor). The plough is thus kept at the proper level by its supporting wheel which is adjusted in suitable manner, the ground exerting of course a reaction upon said supporting wheel.

It is known that, in some working conditions, the rear wheels of the tractor start skidding. In order to oppose this skidding when it takes place, it is necessary temporarily to increase the adhesion of the rear wheels on the ground by transferring onto said wheels a portion of the weight of the plough (this is why this operation is called "load transfer") without however lifting the plough and in such manner as to let the ground exert a reduced reaction upon the supporting wheel.

In a general manner, skidding of the rear wheels of the tractor takes place when the traction effort of the plough increases. But such skidding may also be produced due to the fact that the ground is slippery without the ploughing effort being then the main cause of skidding. Load transfer is of course necessary in both of these cases.

The object of the present invention is to provide a load transfer device which is brought into play automatically in most of the cases where the rear wheels of the tractor risk skidding but the action of which can be corrected by the driver of the tractor in the other cases, that is to say when the rear wheels of the tractor start skidding despite the action of the automatic device, or when the driver knows by experience that his tractor will be running on a particularly slippery ground.

The invention relates to hydraulic control systems for agricultural tractors including distributing means for placing in communication with discharge conduits the active chamber or chambers of the hydraulic motor and the delivery of the feed pump, and also valve means for reducing, preferably gradually, the cross-section area of flow of the power liquid through a common portion or section of the discharge conduits on the one hand of the hydraulic motor active chamber (which controls the lifting of the plough or the like) and on the other hand of the pump delivery, so as thus to increase the pressure upstream of said valve means and thus to produce load transfer.

The invention is characterized in that said valve means are constituted by the combination of two devices capable of reducing the cross-section area of flow of the liquid respectively at two successive points of said common discharge section, one of these devices being operated automatically by a system sensitive to the effort of traction of said plough or the like and the second one being operable by the driver of the tractor.

Preferred embodiments of the present invention will be hereinafter described with reference to the accompanying drawings, given merely by way of example and in which:

FIG. 3 shows on an enlarged scale, partly in section and partly in elevation, the hydraulic system of FIG. 1.

FIG. 4 is a sectional view, on a still larger scale, of a detail of the system of FIG. 3.

Figure 2:
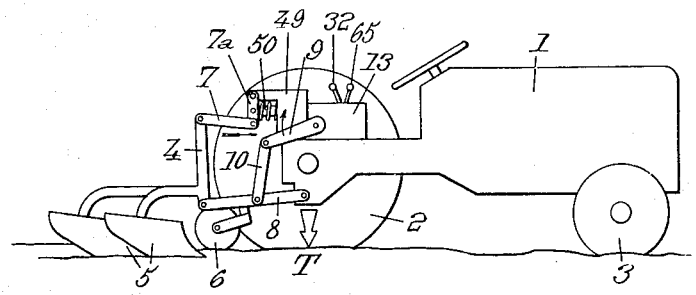
FIG. 2 shows, similarly to FIG. 1, a tractor provided with a hydraulic control system made according to a modification of the invention.
Figure 1:
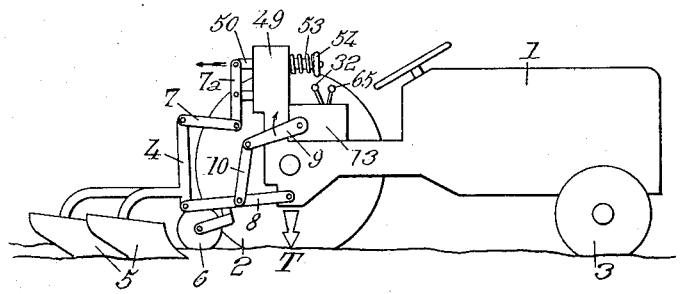
FIG. 1 shows, in diagrammatic elevational view, a tractor provided with a hydraulic control system according to the invention.

As shown by FIGS. 1 and 2, the tractor 1 is provided with a rear wheels 2 and front wheels 3 and it is adapted to draw a "semi-carried" plough 4 including a ploughshare 5 and a supporting wheel 6, this plough being connected with the tractor, for instance through two links 7 and 8 each respectively pivoted to the frame of the tractor and to the plough. It is desired, according to the invention, to provide this tractor with a hydraulic control system including a hydraulic motor capable of lifting and lowering the plough by rotating in the suitable direction a lever 9 connected to link 8 through another link 10.

As shown by FIG. 3, the hydraulic system includes a tank 11 for a power liquid (for the sake of simplicity, the same tank has been shown at different places on FIGS. 3 and 4), a pump 12 working in permanent fashion, a control unit 13 and a hydraulic motor 14. By way of example, it is supposed that the hydraulic motor is of the double action type. In other words, it includes, on either side of the head 15 of its piston 18, active chambers 16 and 17 which, respectively, control the lifting (solid lines arrow of FIG. 3) and the lowering (dotted lines arrow) of the plough, the rod 18 of said piston being connected, through a lever 19, with a transverse shaft 20 on which lever 9 is fixed.

Between the delivery conduit 21 of pump 12 and two conduits 22 and 23 leading respectively to the hydraulic motor chambers 16 and 17, there is interposed a control unit 13 essentially constituted by a three-position slide valve 24 and two piloted check valves 25 and 26.

Check valves 25 and 26 are intended to prevent the conduits 22 and 23 from being placed in communication with the discharge conduit when distributing slide valve 24 is in its middle position (shown by FIG. 3) without being fed under pressure through conduit 21. Of course, check valves 25 and 26 might be replaced by a distributing slide valve piloted by slide valve 24.

In the middle position that is shown, the surfaces 24a and 24b of slide valve 24 cut off the communication between the delivery conduit 21 of the pump and two conduits 27 and 28 leading respectively, past check valves 25 and 26, toward conduits 22 and 23. The hydraulic motor is thus stopped in the position it occupies and pump 12 delivers liquid into tank 11 past a discharge valve 29.

When slide valve 24 is moved toward the right, the liquid delivered by the pump is fed to chamber 16 through conduit 27, check valve 25 and conduit 22, which causes the plough to be lifted. At the same time, the liquid under pressure of conduit 27 flows, through a branch conduit 27a, to the under face of one of the pistons 30, thus causing check valve 26 to be lifted, which enables the liquid driven out from chamber 17 to flow through conduit 23 and to be evacuated through conduit 28 toward one of the discharge conduits 31.

When slide valve 24 is moved toward the left, the liquid delivered by the pump is fed to the chamber 17 of the hydraulic motor through conduit 28, check valve 26 and conduit 23, which causes the plough to be lowered. Simultaneously, the liquid under pressure in conduit 28 flows, through a branch conduit 28a, to the under face of the other piston 30, thus causing it to lift check valve 25. The liquid driven out from chamber 16 is thus enabled to flow through conduit 22 and to be evacuated through conduit 27 toward the other of the discharge conduits 31.

In this embodiment of the invention, the control unit 13 is operated by a lever 32 which acts upon slide valve 24 through a rod 33 and a lever 34 pivoted at 35 to rod 33, at 36 to slide valve 24 and at 37 to a link 38 driven by the piston rod 18. When lever 32 is moved in the direction of the solid lines arrow, lever 34 swings toward the right about point 37, causing slide valve 24 to move toward the right, which produces, as above stated, a displacement of lever 9 in the direction of the solid lines arrow (lifting of the plough). Lever 34, driven by link 38, then swings toward the left about point 35, thus returning slide valve 24 into the mean position shown by the drawing, which stops lever 9 in the position corresponding to that indicated by lever 32.

A distributing system is provided to place in communication with the discharge conduits the two chambers 16 and 17 of the hydraulic motor and the delivery conduit 21 of pump 12, and means are also provided to reduce, preferably in a gradual manner, the cross-section area of flow of the power liquid through a conduit section common to the discharge circuits on the one hand of the chamber 16 of the hydraulic motor (which chamber controls the lifting of the plough) and on the other hand of the delivery of the pump.

Advantageously, for this purpose, there is provided an auxiliary distributing device 39, shown on FIG. 3 by a rectangle and indicated in a detailed manner on FIG. 4, this auxiliary distributing device 39 including a plunger 40 capable, according to the position it occupies in a cylinder 41, either of connecting the control unit 13 with the pump (inactive position), or of separating it from the pump and simultaneously placing both of the chambers 16 and 17 of the hydraulic motor in communication with the discharge conduits (active position shown by FIG. 4).

Two successive portions of the delivery conduit 21 of the pump open into cylinder 41 at points such that, in the inactive position of the plunger, these two portions of conduit 21 communicate together through a groove 42, whereas when the plunger is in active position (as shown by FIG. 4), said portions of conduit 21 are separated from each other by plunger 40. Two conduits 22a and 23a, branching off respectively from conduits 22 and 23, also open into cylinder 41 at points such that these last mentioned conduits are stopped by plunger 40 in the inactive position thereof, but are both connected, together with the upstream portion of delivery conduit 21, with a discharge conduit 43 leading to tank 11, through a central passage 44 and orifices 45, 46, 47, in the active position of the plunger (FIG. 4). This last mentioned orifice is stopped when plunger 40 is in its inactive position but is placed in communication, through a groove 48, with the discharge conduit 43 for the active position of plunger 40.

In the embodiment shown by the drawing, it has been supposed that the cross-section of chamber 16, which controls the lifting of the plough, is substantially greater than that of chamber 17, which controls the lowering of the plough, due to the presence, in this last mentioned chamber, of piston rod 18, so that any pressure established in both of the chambers 16 and 17 tends to lift the plough. However, if the cross-sections of the chambers 16 and 17 did not comply with the above stated condition, it would suffice to provide for conduit 23a, starting from chamber 17, a discharge conduit distinct from the above mentioned discharge conduit 43.

Now, according to the invention, there are provided in combination two devices capable of reducing the cross-section area of flow through discharge conduit 43 at two successive points, one of these devices being actuated automatically by means responsive to the traction effort of the plough and the second one being adapted to be actuated by the driver.

Preferably, this second device is subjected to the action of a return spring capable of returning it into the inactive position, which corresponds to the maximum section of flow through the conduit 43 at the point that is considered.

According to the embodiment of the invention shown by the drawing, the first of these devices as constituted by a distributing valve 49 consisting of a plunger 50 slidable in a cylinder provided with two successive grooves 51 and 52 connected respectively with the upstream section and the downstream section of conduit 43. Plunger 50 is subjected to the action of a powerful spring 53 the loading of which may be adjusted by a handwheel 54 which tends to apply a shoulder 55 against the body of distributing valve 49.

Plunger 50 is further subjected to the traction effort of the plough, or to an effort proportional thereto, exerted either directly or indirectly. As shown by FIG. 1, link 7 is connected to the frame of the tractor through another link 7a the middle portion of which is pivoted to said frame and the respective ends of which are pivotally connected to link 7 and plunger 50 respectively. In this manner, when the traction effort increases and as soon as its value exceeds the loading effort of spring 53, plunger 50 moves toward the left (FIGS. 1 and 4), which throttles the flow of the liquid through conduit 43 where said liquid passes between grooves 51 and 52. For this purpose, plunger 50 is advantageously provided with a surface 56 of a diameter substantially equal to the diameter of the bore portion 57 which extends between grooves 51 and 52, this surface 56 being provided with slots 58 the cross-section of which decreases from left to right. The displacements of plunger 50 toward the left of FIG. 4 may be limited for instance by a shoulder 59 cooperating with an abutment 60.

The second mentioned valve device is similarly constituted by providing in a cylinder 41, in addition to groove 48, a groove 61, a bore portion 62, a surface 63 and slots 64 analogous to the elements of valve device 49 designated respectively by 51, 52, 57, 56 and 58, surface 63 being advantageously provided in the slide valve plunger 40 and conduit 43 starting from groove 61. However, plunger 40 is provided with a manual control lever 65 and with a spring 66 which tends to give the maximum opening to the passage between grooves 48 and 61, while exerting no opposition to the displacements of plunger 40 between its active and inactive positions as above defined.

There may be provided on discharge conduit 43 a cock 67 which permits of short-circuiting the automatic control distributing valve device 49.

In order to limit the load transfer pressure established in the two chambers of the hydraulic motor to a value lower than that which causes the lifting of the plough, there is advantageously provided, between groove 48 and tank 11, a passage provided with a calibrated orifice and controlled in such manner by plunger 40 that it is closed in the inactive position thereof, but opened in the other positions. This passage may consist of a conduit 68 provided in the plunger and separated from passage 44, this conduit 68 being in permanent communication with a discharge conduit 69 and opening, through a calibrated orifice, 70, into the outer wall of the plunger, at a point such that it is closed by the body of the distributing valve device 39 when plunger 40 is in its inactive position.

This hydraulic control system works in the following manner:

When plunger 40 is in its active position (shown by FIG. 4), the higher the traction effort, the more plunger 50 is moved toward the left, compressing spring 53. For a given adjustment of this spring, the throttled interval between surface 56 and the bore portion 57 of the automatic distributing device 49 is the greater as this effort is higher, and this in accordance with a law which depends upon the shape of slots 58. Obviously, this throttled space creates in the chambers 16 and 17 of the hydraulic motor a counter-pressure which ensures the load transfer in a known manner. This causes the production of a supplementary load diagrammatically illustrated by arrow T (FIG. 1).

If the traction effort is too much increased with respect to the tension of spring 53, the displacement of plunger 50 is limited by contact of shoulder 59 against abutment 60.

The maximum transfer pressure takes place when the displacement of plunger 50 toward the left entirely cuts off the communication between grooves 51 and 52. All the flow of liquid then passes through calibrated orifice 70 the dimension of which determines said maximum pressure.

If the driver wishes to correct the transfer pressure, when the automatic throttling by means of surface 56 with its slots 58 is insufficient or when the driver wishes to produce a load transfer without the traction effort being increased (slippery ground), he acts upon the lever 65 for the manual control of plunger 40, so as to move it from left to right. Owing to the provision of surface 63 with its slots 64, this causes a throttling of the flow of the liquid from groove 48 toward groove 61. The transfer pressure rises, because the throttling produced between grooves 48 and 61 is in series with the throttling produced between grooves 51 and 52.

If the driver moves plunger 40 to its limit position toward the right, the maximum transfer pressure is determined by the dimensions of calibrated orifice 60 and by the delivery rate of the pump.

When both of the throttling actions are exerted simultaneously, it is also the calibrated orifice 70 which determines the maximum transfer pressure which can never be exceeded.

As soon as the driver, after having acted upon lever 65 to modify the transfer pressure, releases said lever, the latter comes back into the position shown by FIG. 4 under the action of spring 66. The automatic transfer conditions are then restored.

In the modification of FIG. 2, the pivot axes of link 7a on the frame of the tractor and plunger 50 are reversed with respect to the arrangement of FIG. 1. In this case, the traction effort corresponds to a thrust exerted on the plunger 50 in the frontward direction. In this case, it suffices to reverse the position of plunger 50 with respect to the arrangement shown by FIG. 4.

In a general manner, while we have, in the above description, disclosed what we deem to be practical and efficient embodiments of our invention, it should be well understood that we do not wish to be limited thereto as there might be changes made in the arrangement, disposition and form of the parts without departing from the principle of the present invention as comprehended within the scope of the accompanying claims.

What we claim is:

1. For use in connection with an agricultural machine including a tractor, an agricultural implement movably connected with said tractor, a hydraulic motor carried by said tractor, said hydraulic motor including a cylinder and a piston movable in said cylinder to limit therewith at least one active chamber, linkage means operatively connecting said piston with said implement so that a rise of pressure in said chamber urges said implement upwardly, a hydraulic pump connected with said cylinder for feeding liquid to said active chamber, discharge means and conduit means for placing said discharge means in communication both with said active chamber and with said pump, said discharge means including a section for the common outflow of liquid from both said active chamber and said pump, the combination of distributing means in said conduit means for placing said active chamber and said pump both in communication with said common discharge section and load transfer means in said common discharge section for reducing the cross-section area of flow of liquid through said common discharge section, said load transfer means comprising two normally open valve devices located in series at different points of said common discharge section respectively and both for throttling the liquid stream flowing through said common discharge section at said two points thereof, respectively, means responsive to variations of the traction effort of said implement for operating one of said valve devices in accordance with the value of said effort arranged to close said last mentioned valve device more and more as the value of said traction effort increases, and manual means for operating the other of said valve devices arranged to close it gradually.

2. A combination according to claim 1 in which said second mentioned valve device is arranged to have an inactive position in which it exerts practically no throttling action on the liquid stream flowing through said common discharge section, and spring means operatively connected with said second mentioned valve device for urging it toward said inactive position.

3. For use in connection with an agricultural machine including a tractor, an agriculture implement movably connected with said tractor, said hydraulic motor including a cylinder and a piston movable in said cylinder to limit therewith at least one active chamber, linkage means operatively connecting said piston with said implement so that a rise of pressure in said chamber urges said implement upwardly, a hydraulic pump connected with said cylinder for feeding liquid to said active chamber, discharge means and conduit means for placing said discharge means in communication both with said active chamber and with said pump, said discharge means including a section for the common outflow of liquid from both said active chamber and said pump, the combination of distributing means in said conduit means for placing said active chamber and said pump both in communication with said common discharge section and load transfer means in said common discharge section for reducing the cross-section area of flow of liquid through said common discharge section, said load transfer means comprising two normally open valve devices located in series at different points of said common discharge section respectively and both for throttling the liquid stream flowing through said common discharge section at said two points thereof, respectively, means responsive to variations of the traction effort of said implement for operating one of said valve devices in accordance with the value of said effort, arranged to close said last mentioned valve device more and more as the value of said traction effort increases, and manual means for operating the other of said valve devices arranged to close it gradually, said first mentioned valve device including a cylinder provided with two distinct annular grooves connected respectively with the upstream end and the downstream end of said common discharge section respectively, a plunger slidable in said last mentioned cylinder to control the communication between said grooves, link means interposed between said implement and said plunger so as to be operative in response to variations of said traction effort for urging said plunger in one direction with respect to said cylinder, and a spring interposed between said plunger and said cylinder for urging said plunger in the other direction with respect to said cylinder.

4. For use in connection with an agricultural machine including a tractor, an agricultural implement movably connected with said tractor, said hydraulic motor including a cylinder and a piston movable in said cylinder to limit therewith at least one active chamber, linkage means operatively connecting said piston with said implement so that a rise of pressure in said chamber urges said implement upwardly, a hydraulic pump connected with said cylinder for feeding liquid to said active chamber, discharge means and conduit means for placing said discharge means in communication both with said active chamber and with said pump, said discharge means including a section for the common outflow of liquid from both said active chamber and said pump, the combination of distributing means in said conduit means for placing said active chamber and said pump both in communication with said common discharge section and load transfer means in said common discharge section for reducing the cross-section area of flow of liquid through said common discharge section, said load transfer means comprising two normally open valve devices located in series at different points of said common discharge section respectively and both for throttling the liquid stream flowing through said common discharge section of said two points thereof, respectively, means responsive to variations of the traction effort of said implement for operating one of said valve devices in accordance with the value of said effort, arranged to close said last mentioned valve device more and more as the value of said traction effort increases, and manual means for operating the other of said valve devices arranged to close it gradually, said second mentioned valve device being arranged to have an inactive position in which it exerts practically no throttling action on the liquid stream flowing through said common discharge section, and spring means operatively connected with said second mentioned valve device for urging it toward said inactive position, said second mentioned valve device being combined with said distributing means, said second mentioned valve device including a cylinder and a plunger slidable in said cylinder, said cylinder being provided with two distinct annular grooves, said cylinder being provided with a passage connecting one of said grooves with said pump and with said active chamber, the other of said grooves being in communication with said common discharge section, said plunger cutting off, during a portion of its sliding movement, said grooves from each other.

5. For use in connection with an agricultural machine including a tractor, an agricultural implement movably connected with said tractor, said hydraulic motor including a cylinder and a piston movable in said cylinder to limit therewith at least one active chamber, linkage means operatively connecting said piston with said implement so that a rise of pressure in said chamber urges said implement upwardly, a hydraulic pump connected with said cylinder for feeding liquid to said active chamber, discharge means and conduit means for placing said discharge means in communication both with said active chamber and with said pump, said discharge means including a section for the common outflow of liquid from both said active chamber and said pump, the combination of distributing means in said conduit means for placing said active chamber and said pump both in communication with said common discharge section and load transfer means in said common discharge section for reducing the cross-section area of flow of liquid through said common discharge section, said load transfer means comprising two normally open valve devices located in series at different points of said common discharge section respectively and both for throttling the liquid stream flowing through said common discharge section at said two points thereof, respectively, means responsive to variations of the traction effort of said implement for operating one of said valve devices in accordance with the value of said effort, arranged to close said last mentioned valve device more and more as the value of said traction effort increases, manual means for operating the other of said valve devices arranged to close it gradually, a liquid tank for said pump, said plunger being provided with a passage connecting said first mentioned groove with said tank, said passage including an orifice of small cross-section and being opened by the movement of said plunger only when said plunger places said active chamber and said pump into communication with said common discharge section.

References Cited in the file of this patent

UNITED STATES PATENTS

| 2,689,513 | Ferguson et al. | Sept. 21, 1954 |
| 2,722,873 | Garmager | Nov. 8, 1955 |
| 2,764,923 | Morgen | Oct. 2, 1956 |
| 2,851,938 | Giertz et al. | Sept. 16, 1958 |

FOREIGN PATENTS

| 1,144,281 | France | Apr. 23, 1957 |
| 1,024,740 | Germany | Feb. 20, 1958 |